United States Patent [19]

Inoue et al.

[11] Patent Number: 4,480,712
[45] Date of Patent: Nov. 6, 1984

[54] SUPERCHARGER APPARATUS IN MOTORIZED TWO-WHEELED VEHICLE

[75] Inventors: Kazuo Inoue, Tokyo; Minoru Matsuda, Chofu; Takashi Shinozaki, Tokorozawa, all of Japan

[73] Assignee: Honda Giken Kogyo Kabushiki Kaisha, Tokyo, Japan

[21] Appl. No.: 254,269

[22] Filed: Apr. 15, 1981

[30] Foreign Application Priority Data

Apr. 15, 1980 [JP] Japan ................................. 55-48589
Apr. 17, 1980 [JP] Japan ................................. 55-49578

[51] Int. Cl.³ ............................................. F02D 23/00
[52] U.S. Cl. ................................... 180/219; 60/598; 60/605; 123/559; 180/227
[58] Field of Search ................... 180/219, 225, 229; 293/106 NP; 280/5 R, 5 H, 781-783; 123/559; 60/605, 598

[56] References Cited

U.S. PATENT DOCUMENTS

| 3,453,824 | 7/1969 | Biesecker | 180/225 X |
| 3,919,896 | 11/1975 | Foster | 180/225 X |
| 4,226,296 | 10/1980 | Higaki | 180/219 |
| 4,237,996 | 12/1980 | Matsuda et al. | 180/229 |
| 4,280,582 | 7/1981 | Kouyama et al. | 180/225 X |

FOREIGN PATENT DOCUMENTS

| 1091580 | 10/1954 | France | 180/225 |
| 64337 | 5/1979 | Japan | 180/219 |
| 118907 | 9/1979 | Japan | 60/605 |
| 55-1443 | 1/1980 | Japan . | |
| 749037 | 5/1956 | United Kingdom | 180/227 |

*Primary Examiner*—Joseph F. Peters, Jr.
*Assistant Examiner*—Mitchell J. Hill
*Attorney, Agent, or Firm*—Armstrong, Nikaido, Marmelstein & Kubovcik

[57] ABSTRACT

A two wheel vehicle comprising a vehicle body having a front wheel and a rear wheel with an internal combustion engine mounted on the mid portion of the frame is provided. The engine is provided with a supercharger having an exhaust turbine provided on an exhaust passage side thereof and a compressor provided on an intake passage side thereof and arranged to move with the turbine. The supercharger is positioned in a space defined by the engine and a supporting frame which supports the engine and is interposed between the engine and the front wheel. The defined space is remote from the driver so that the driver is not affected by the supercharger. The supercharger may be mounted on the supporting frame so that it is protected against external frontal or lateral forces.

6 Claims, 9 Drawing Figures

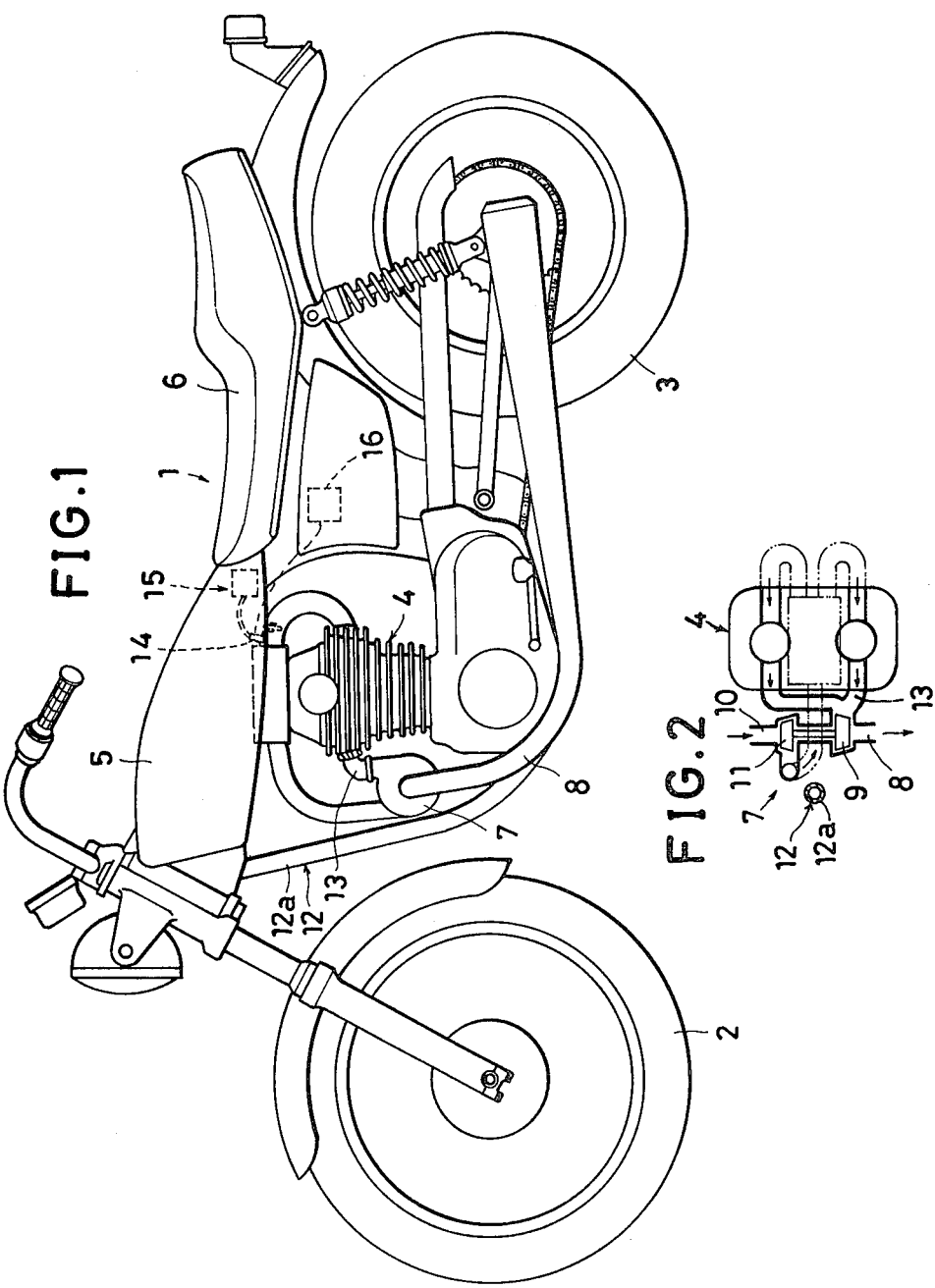

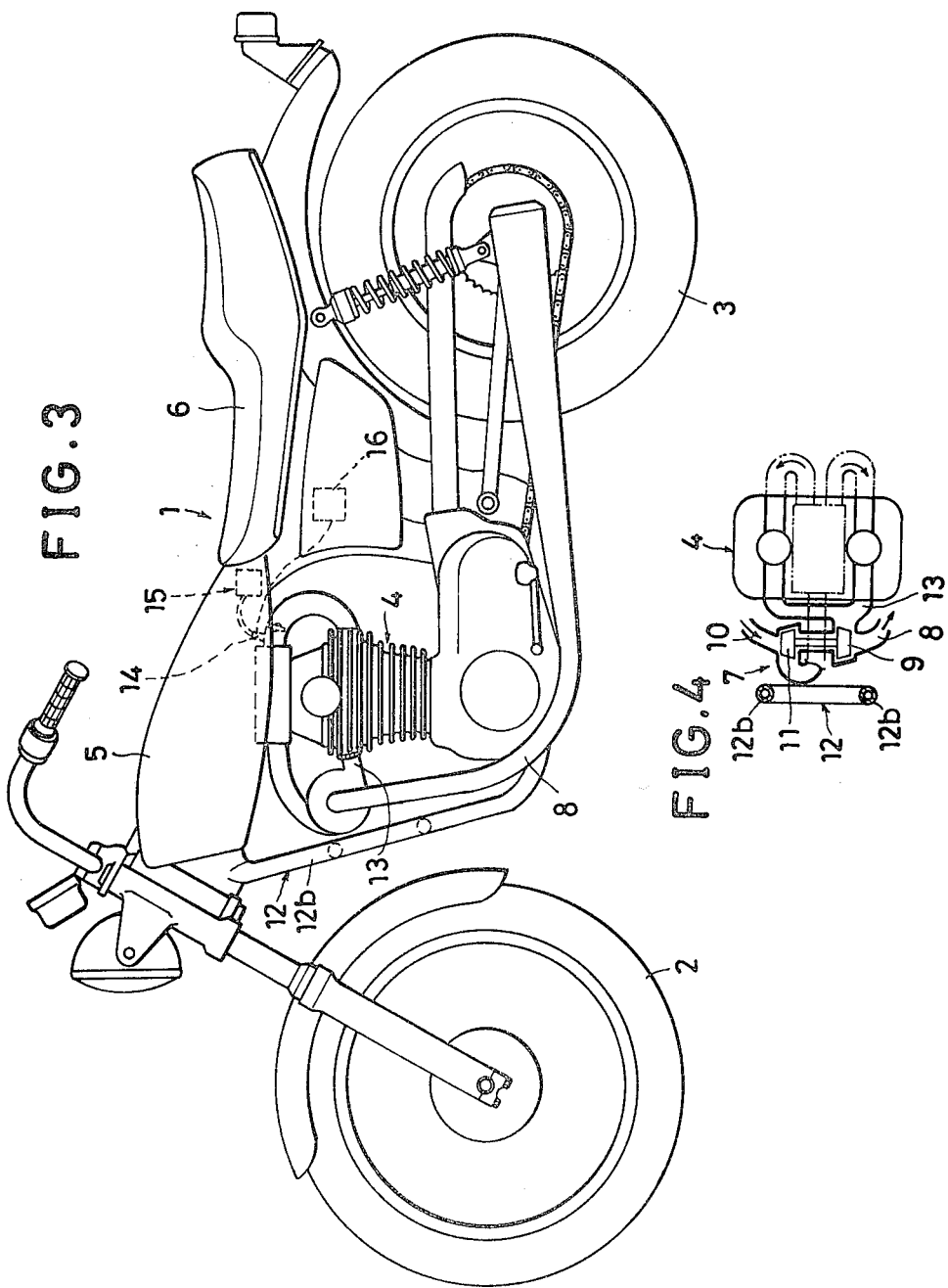

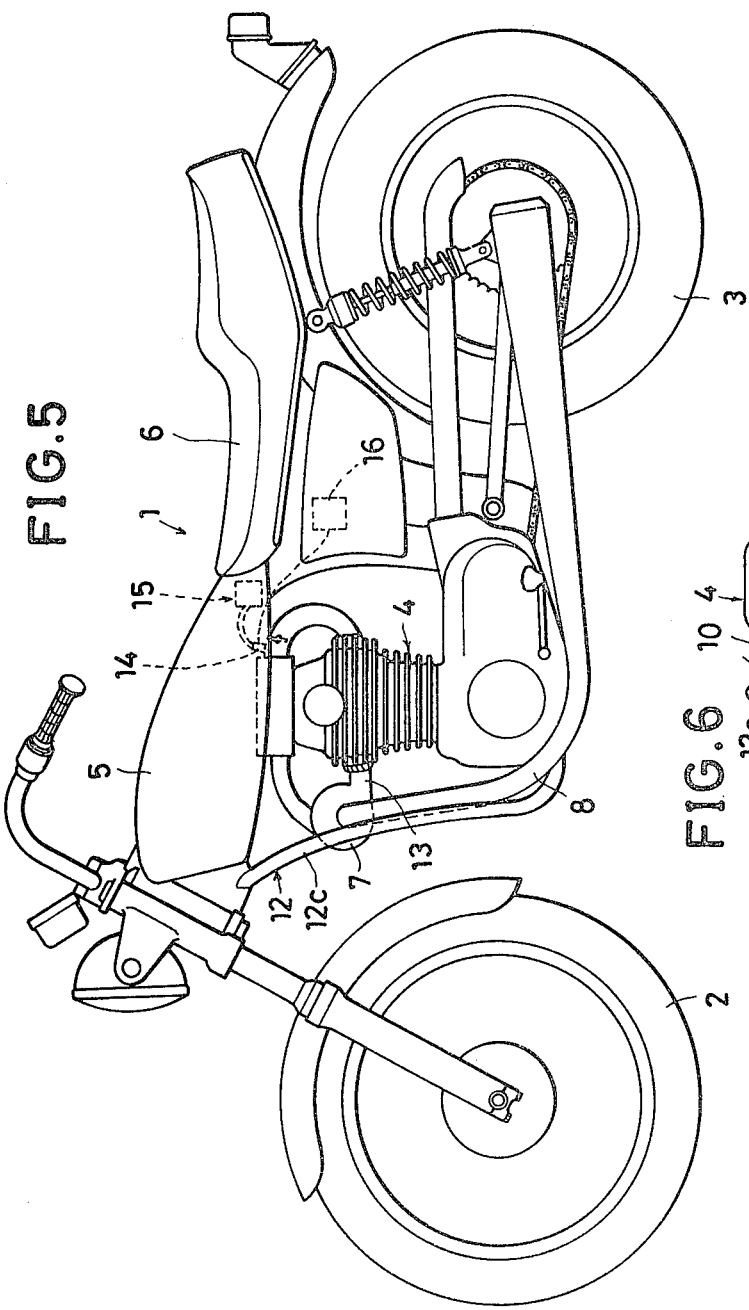
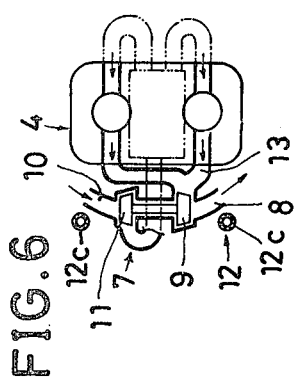
FIG.5
FIG.6

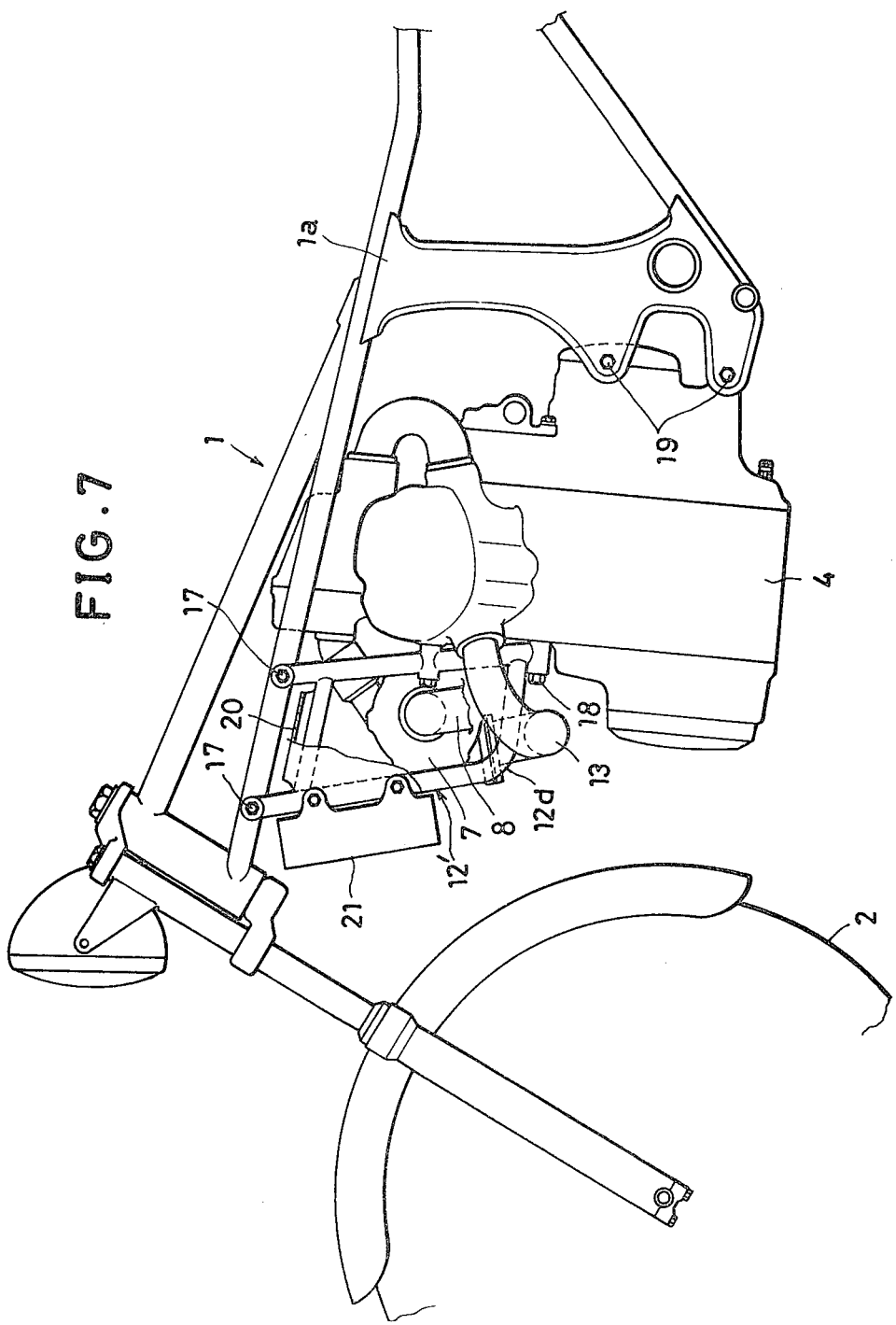

SUPERCHARGER APPARATUS IN MOTORIZED TWO-WHEELED VEHICLE

BACKGROUND OF THE INVENTION

1. Field of the Invention

This invention relates to a supercharger apparatus for an internal combustion engine in a motorized two-wheeled vehicle such as a motorcycle or the like, and more particularly to a supercharger apparatus which is mounted in front of the vehicle engine where it is remote from the driver and in a manner which protects it from external forces.

2. Description of the Prior Art

There has been hitherto known a vehicle body having a front wheel and a rear wheel with an internal combustion engine mounted therebetween. The engine is provided with a supercharger comprising an exhaust turbine on an exhaust passage side thereof and a compressor on an intake passage side thereof.

SUMMARY OF THE INVENTION

It is the primary object of the present invention to provide a supercharger apparatus for a motorcycle which is mounted in front of the engine such that it is remote from the driver.

It is another object of the present invention to provide a supercharger apparatus which is mounted on a motorcycle in such a manner as to be protected from external forces.

It is still a further object of the present invention to provide a supercharger apparatus which is mounted on a motorcycle in such a manner that the mounting structure may be disconnected from the motorcycle frame to allow access to the supercharger.

The present invention is directed to a two wheel vehicle comprising a vehicle body having a front wheel and a rear wheel with an internal combustion engine mounted on the mid portion of the frame. The engine is provided with a supercharger having an exhaust turbine provided on an exhaust passage side thereof and a compressor provided on an intake passage side thereof and arranged to move with the turbine. The supercharger is positioned in a space defined by the engine and a supporting frame which supports the engine and is interposed between the engine and the front wheel. The defined space is remote from the driver so that the driver is not affected by the supercharger. The supercharger may be mounted on the supporting frame so that it is protected against external frontal or lateral forces.

BRIEF DESCRIPTION OF THE DRAWINGS

FIG. 1 is a side view of a first embodiment of the present invention.

FIG. 2 is a sectional plan view thereof.

FIG. 3 is a side view of a second embodiment of the present invention.

FIG. 4 is a sectional plan view thereof.

FIG. 5 is a side view of a third embodiment of the present invention.

FIG. 6 is a sectional plan view thereof.

FIG. 7 is a side view of a fourth embodiment of the present invention.

DETAILED DESCRIPTION OF THE PREFERRED EMBODIMENTS

Figure 9:
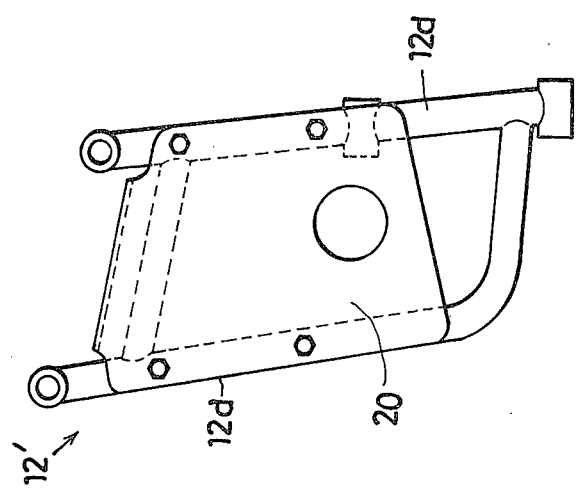
FIG. 9 is a side view thereof.

Referring to FIGS. 1 and 2 which show one embodiment of the present invention. A motorized two-wheeled vehicle such as a motorcycle or the like has a body 1, a front wheel 2, a rear wheel 3, and an internal combustion engine 4 in the mid portion of the body. A fuel tank 5 is mounted on the upper side of the body and a driver's seat 6 is mounted to the rear of the fuel tank 5. The engine 4 is provided with a supercharger 7. As shown in FIG. 2, the supercharger 7 comprises an exhaust turbine 9 positioned in an exhaust passage 8 of the engine 4, and a compressor 11 which is positioned in an intake passage 10 of the engine 4 and is arranged to be driven by the turbine 9. As shown in FIG. 1, the supercharger 7 is located in a space defined by the engine 4 and a supporting frame 12 which serves to support the engine 4 and is interposed between the engine 4 and the front wheel 2 located in front of the engine 4. In this embodiment, the supporting frame 12 comprises a single down-tube type pipe 12a extending upwards and downwards in front of the supercharger 7.

In an alternate embodiment, a pair of right and left pipes 12b, 12b are disposed in front of the supercharger 7 as shown in FIGS. 3 and 4.

The supercharger 7 may be positioned lower than an exhaust port 13 of the engine 4 as in the embodiment of FIG. 1. The fuel supply system for the engine 4 is an electronic control type and an injection nozzle 14, a fuel supply means 15 and an electronic control means 16 are located to the rear of the engine 4.

When the engine 4 is operating, the supercharger 7 is operated thereby to give to the engine 4 its supercharging effect. This operation is not different from that in a conventional motorcycle. According to the present invention, even if the front wheel 2 or additionally a front fork should be damaged by the external force acting from front, the supercharger can be prevented from being damaged, because the same is guarded on its front side by the supporting frame 12.

In the embodiment shown in FIGS. 5 and 6, the supporting frame 12 comprises a pair of right and left pipes 12c, 12c on both lateral outsides of the supercharger 7 so that the supercharger 7 may be guarded thereby from external forces acting from the sides.

In positioning the supercharger 7 in the space defined by the supporting frame 12 and the engine 4 as described above, if the supporting frame 12 is fixedly connected to the vehicle body 1 by welding or the like, attaching and detaching of the supercharger 7 becomes difficult.

Figure 8:
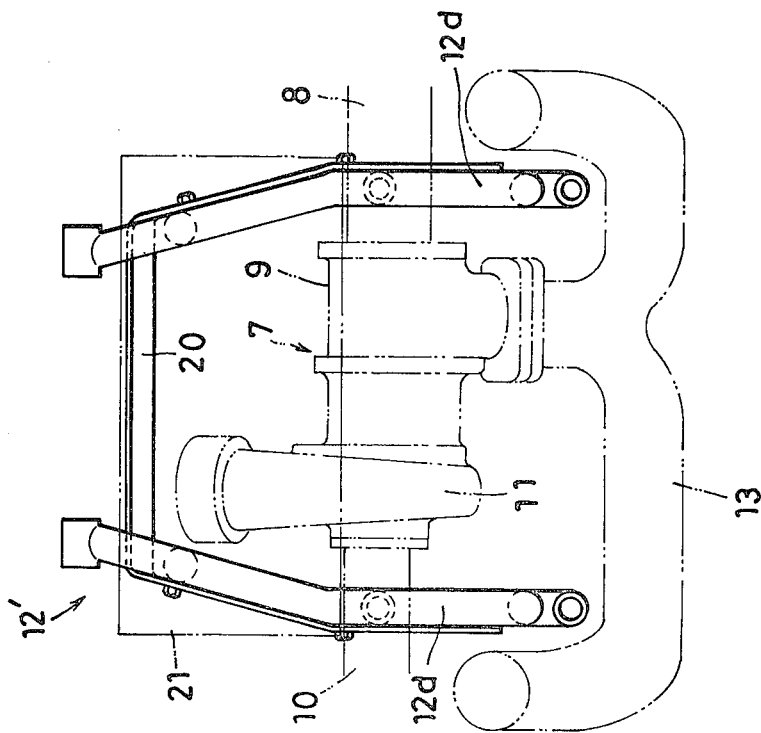
FIG. 8 is a front view of a supporting frame thereof.

In another alternate embodiment shown in FIGS. 7-9, the supporting frame 12' is a hanger type which is detachably attached at its upper portion to the vehicle body 1 through bolts 17 or the like. Attaching and detaching of the supercharger 7 can be carried out easily in this embodiment because the supporting frame 12' can be easily detached from the vehicle body 1.

The supporting frame 12' is attached at its lower end portion through bolts 18 or the like to the front portion of the engine 4, and the engine 4 is, in turn, connected at its rear portion through bolts 19 or the like to an attaching frame 1a of the vehicle body 1, so that the engine 1 is prevented from dropping even if the supporting frame 12' is detached.

In the illustrated embodiment, the supporting frame 12' comprises a pair of frame portions 12d, 12d each of which is assembled by plural pipes each positioned to the side of the supercharger 7, so that the protection of the supercharger 7 is more reliable.

Additionally, the supporting frame 12' is provided with a heat shield plate 20 covering the supercharger 7 for preventing the driver from being affected by hot air. The plate 20 is formed into nearly a U-shaped plate bridging between the frame portions 12d, 12d disposed on the opposite sides and is fixed to the front and rear pipes of each frame portion 12d. A radiator 21 is provided in front of the supporting frame 12'.

The present invention may be embodied in other specific forms without departing from the spirit or essential characteristics thereof. The presently disclosed embodiments are therefore to be considered in all respects as illustrative and not restrictive, the scope of the invention being indicated by the appended claims, rather than the foregoing description, and all changes which come within the meaning and range of equivalency of the claims are, therefore, to be embraced therein.

We claim:

1. A supercharger apparatus in a motorized two-wheel vehicle comprising a vehicle body having a front wheel, a rear wheel and a supporting frame, an internal combustion engine mounted on said supporting frame, said engine including a supercharger comprising an exhaust turbine provided on an exhaust passage side of said engine and a compressor provided on an intake passage side of said engine for movement with said turbine; first connecting means for detachably connecting an upper end portion of said supporting frame to said vehicle body; and second connecting means for detachably connecting a lower end portion of said supporting frame to a front portion of said engine, said engine being mounted at the rear portion thereof to said vehicle body; wherein said supporting frame and said engine define a space therebetween and said supercharger is positioned in said space in front of said engine and below the top of said engine.

2. A supercharger apparatus as claimed in claim 1, wherein said supporting frame comprises at least one pipe positioned in front of said supercharger.

3. A supercharger apparatus as claimed in claim 1, wherein the supporting frame comprises at least one pair of pipes disposed in front of said supercharger.

4. A supercharger apparatus as claimed in claim 1, wherein said supporting frame comprises at least one pair of pipes disposed on opposite sides of said supercharger.

5. A supercharger apparatus as claimed in claim 1, wherein said supporting frame comprises a pair of frame portions disposed on opposite sides of said supercharger, and each of said frame portions include plural pipes assembled to surround said supercharger on the sides thereof.

6. A supercharger apparatus as claimed in claim 5, wherein said supporting frame includes a heat shield plate covering the supercharger.

* * * * *